United States Patent
Kanatsiz et al.

[15] 3,659,532
[45] May 2, 1972

[54] PALLET AND RAIL MATERIAL HANDLING APPARATUS

[72] Inventors: Necati Kanatsiz, Spring Valley; Floyd E. Davis, San Diego, both of Calif.

[22] Filed: Apr. 12, 1971

[21] Appl. No.: 133,408

Related U.S. Application Data

[63] Continuation of Ser. No. 783,021, Dec. 11, 1968, abandoned.

[52] U.S. Cl............................105/177, 214/16 B, 238/122
[51] Int. Cl.......................................B61f 11/00, B61j 1/10
[58] Field of Search.................104/1, 141; 105/366, 177; 246/465; 198/129; 193/35; 214/84, 16 B; 238/122, 134

[56] References Cited

UNITED STATES PATENTS

| | | | |
|---|---|---|---|
| 1,053,895 | 2/1913 | Algermissen | 193/35 X |
| 1,287,759 | 12/1918 | Russell | 105/366 |
| 1,563,863 | 12/1925 | Joyner | 214/84 |
| 1,900,867 | 3/1933 | Olds | 214/152 |
| 1,932,955 | 10/1933 | Coppinger | 214/38 |
| 2,278,193 | 3/1942 | Discher | 238/10 X |
| 2,469,575 | 5/1949 | Ralston et al. | 246/465 |
| 3,176,828 | 4/1965 | Sullivan | 193/35 C X |
| 3,243,062 | 3/1966 | Frassetto | 193/35 MD X |

FOREIGN PATENTS OR APPLICATIONS

| | | | |
|---|---|---|---|
| 8,278 | 5/1952 | France | 238/122 |

*Primary Examiner*—Gerald M. Forlenza
*Assistant Examiner*—Raymond B. Johnson
*Attorney*—George E. Pearson

[57] ABSTRACT

Conveying apparatus comprising tracks which form a main line, a plurality of spur tracks which intersect the main line tracks and extend laterally therefrom, and one or more pallets provided with rotatable ball supports which roll on said main line and spur tracks and which permit pallets to be transferred therebetween. The pallets are provided with rotatable support members at their upper surfaces to facilitate loading and unloading of materials thereon and to enable the apparatus to be used as a conventional conveyor when a plurality of the pallets are placed in end-to-end relation along the aforesaid tracks.

5 Claims, 9 Drawing Figures

Patented May 2, 1972

*INVENTOR.*
NECATI KANATSIZ
BY  FLOYD E. DAVIS
*Edwin D. Grant*
ATTORNEY

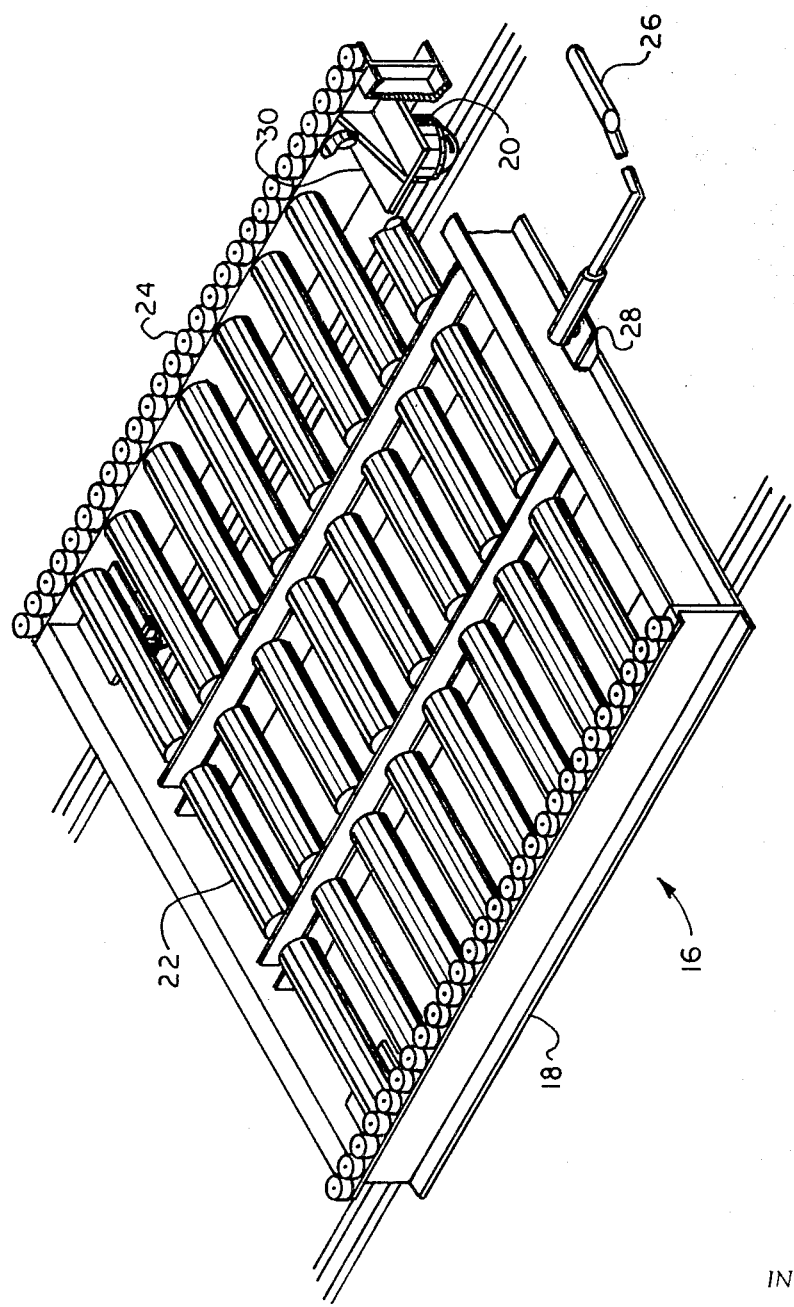

INVENTOR.
NECATI KANATSIZ
BY FLOYD E. DAVIS
Edwin D. Grant
ATTORNEY

INVENTOR.
NECATI KANATSIZ
FLOYD E. DAVIS
BY
Edwin D. Grant
ATTORNEY

Patented May 2, 1972
3,659,532
6 Sheets-Sheet 5
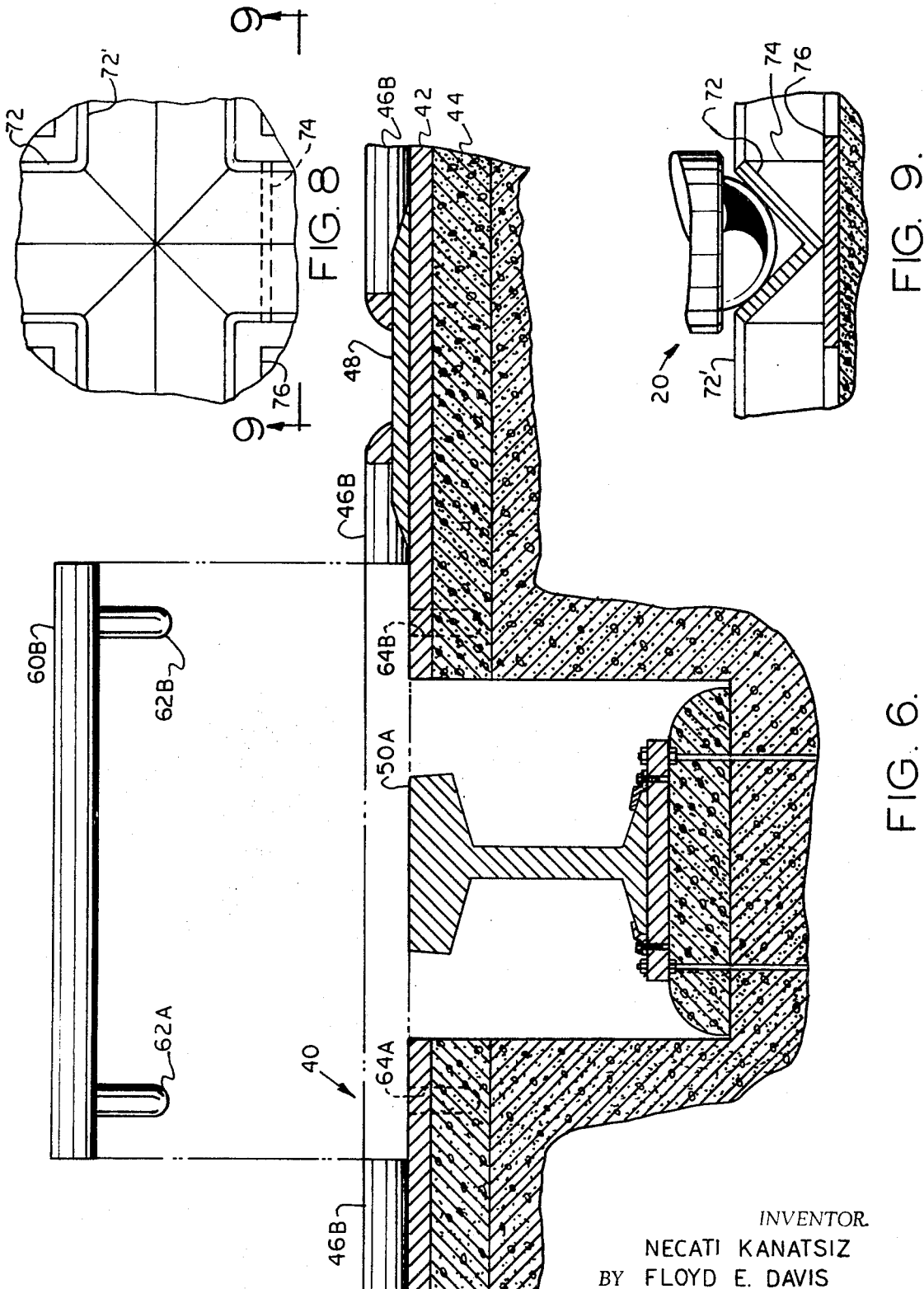
INVENTOR.
NECATI KANATSIZ
BY FLOYD E. DAVIS
Edwin D. Grant
ATTORNEY Patented May 2, 1972

INVENTOR.
NECATI KANATSIZ
BY FLOYD E. DAVIS

Edwin D. Grant

ATTORNEY 3,659,532

PALLET AND RAIL MATERIAL HANDLING APPARATUS

This application is a continuation of Ser. No. 783,021, filed Dec. 11, 1968 and now abandoned.

BACKGROUND OF THE INVENTION

This invention relates to conveying apparatus and more particularly to a conveying system which combines the advantages of roller-frame type conveyors and mobile carts.

Many materials handling operations, such as the unloading of packages from various types of carriers and the storage and retrieval of merchandise in warehouses, involve the conveyance of large numbers of articles from one or more locations to a series of stations, shelves, transfer points, and the like. Such operations have heretofore been conducted by means of individual carts, conveyor belts, or roller conveyors, all of which are limited in utility in some respects. For example, movement of materials by means of carts is excessively expensive for some operations, and conveyor belts and roller conveyors are not sufficiently versatile for use in others. In contrast with previously known conveying equipment, apparatus in accordance with the present invention can readily be adapted to a wide variety of applications, is economical to install and operate, and provides means for moving materials to numerous points quickly and efficiently.

SUMMARY OF THE INVENTION

Briefly stated, preferred embodiments of the invention herein disclosed comprise main or trunk tracks which extend along a series of stations to which materials must be delivered or from which materials must be retrieved, a plurality of secondary or spur tracks each of which intersects each of said main tracks and leads to a respective one of said stations, and at least one and preferably a plurality of rigid pallets each provided with four rotatable ball supports mounted on the lower side thereof and a plurality of rotatable support members mounted on the upper side thereof. Conveying apparatus in accordance with the invention also preferably includes at least one rotatable table positioned adjacent either the aforesaid main tracks or one of the pairs of secondary tracks connected thereto, at least one pair of carrier tracks extending under said secondary tracks (sections of the latter which lie over said carrier tracks being removable), and a carrier adapted to move along said carrier tracks and load materials upon, and unload materials from, pallets positioned on the secondary tracks.

OBJECTS OF THE INVENTION

Accordingly, an object of this invention is to provide new and improved apparatus for transporting materials.

Another object is to provide apparatus capable of being used as a conventional conveyor line or, in the alternative, as a conveyor system employing individual pallets movable along tracks.

Other objects and advantages of the invention will become apparent by consideration of the following description of a specific embodiment thereof.

DESCRIPTION OF THE DRAWINGS

In the accompanying drawings:

FIG. 2 is a pictorial view illustrating a material support pallet constituting a component of the conveying system of FIG. 1 and used therein either separately or in combination with other of the same type of pallets, a portion of the frame of said pallet being broken away in the drawing for clarity;

FIG. 6 is an elevational, partially sectional view of components of the tracks depicted in FIG. 1, taken along the plane represented by the broken line designated 6—6 in FIG. 4 and in the direction indicated therein;

FIG. 8 is a plan view of a modification of the embodiment of the invention illustrated in FIGS. 1–7; and FIG. 9 is an elevational, partially sectional view of components illustrated in FIG. 8, taken along the plane represented by the broken line designated 9—9 in FIG. 8 and in the direction indicated therein.

Throughout the drawings and the following specification like reference numbers refer to like parts.

DETAILED DESCRIPTION

Figure 1:
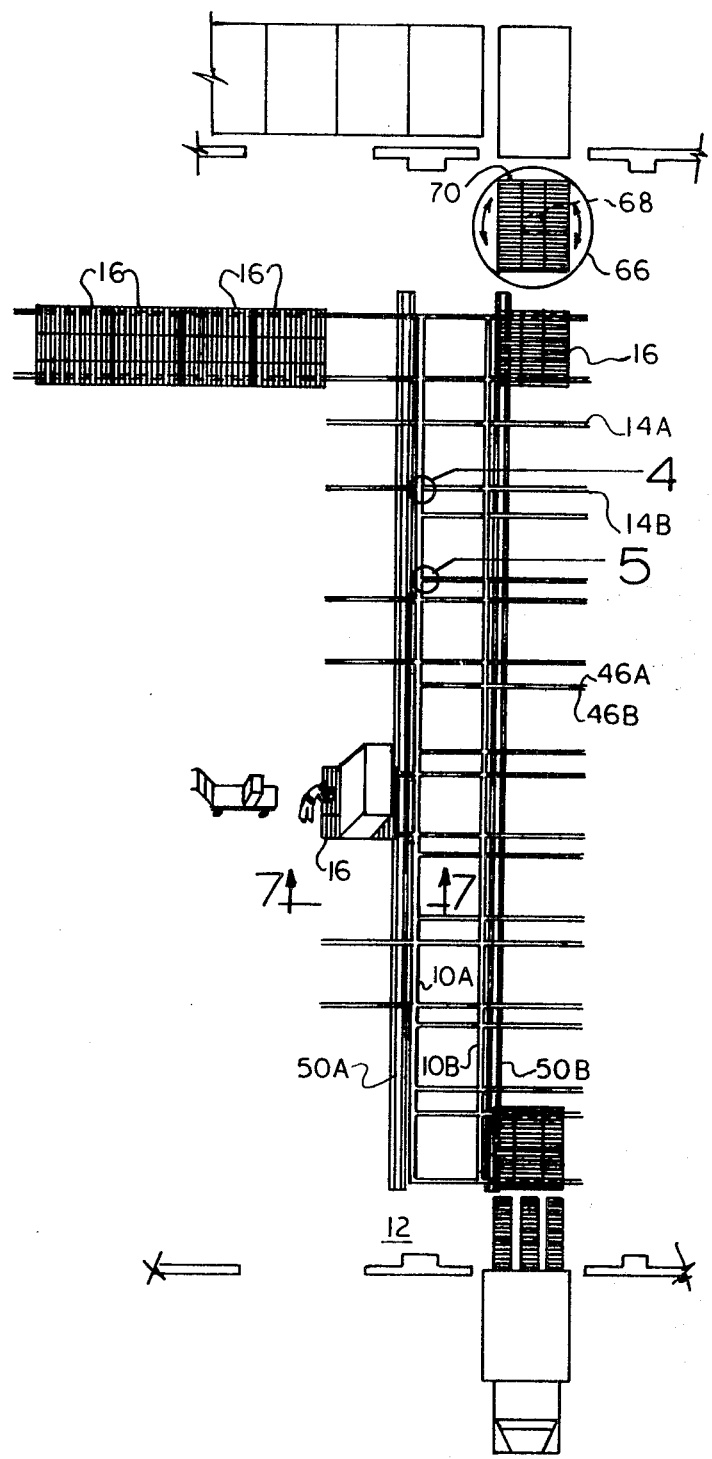
FIG. 1 is a plan view illustrating a preferred embodiment of the invention.

As illustrated in FIG. 1, a preferred embodiment of this invention includes a pair of spaced, parallel main tracks 10A, 10B which may extend, in a typical application, from a loading platform 12 into a warehouse. A plurality of secondary tracks 14A, 14B are arranged in spaced, parallel pairs which lead from main tracks 10A, 10B to points where materials are stored. More particularly, each of the secondary tracks 14A, 14B intersects each of the main tracks 10A, 10B, although at particular locations the secondary tracks may project from only one side of the main tracks whereas at other locations the secondary tracks may project from both sides of said main tracks, depending upon the requirements of a specific conveying system. Illustrated in abutting relation along the pair of secondary tracks 14A, 14B which are uppermost in the same drawing are a plurality of pallets each generally designated by the number 16, a typical one of these pallets being illustrated in detail in FIG. 2. Each pallet 16 preferably comprises a square frame 18 having a rotatable ball support 20 mounted at each corner of the lower side thereof, a plurality of support rollers 22 mounted parallel to the upper surface thereof in spaced, parallel relation to one another, and a plurality of guide rollers 24 mounted along opposite edges of said upper surface. Each pallet is also provided with a T-shaped handle 26 detachably secured by a pin located at the lower end of its stem to a bracket 28 fixedly joined to the front side of frame 18. As can best be seen in FIG. 3, each ball support 20 comprises a plate 30 welded to frame 18, a housing 32 welded to said plate, a ball 34 disposed within a spherical cavity in said housing, a plurality of ball bearings 36 positioned between the surface of said cavity and ball 34, and a retaining ring 38 secured by machine screws (not shown) to the lower surface of housing 32. Being symmetrically located in the corners of the square frame 18, the four ball supports 20 are centered at the corners of a square which, as will be seen hereinafter, is of a predetermined size.

Figure 5:
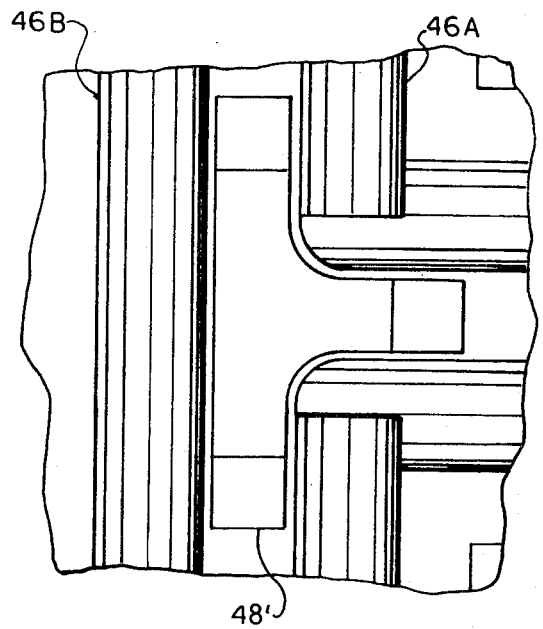
FIGS. 4 and 5 are plan views illustrating typical components of the tracks depicted in FIG. 1, respectively taken at the circles designated 4 and 5 on the latter drawing.
Figure 3:
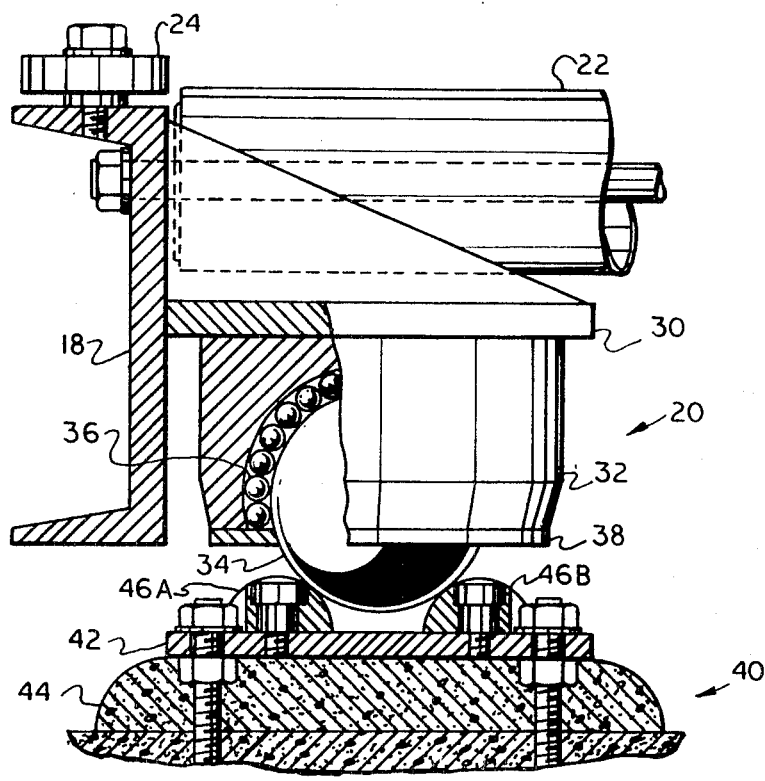
FIG. 3 is an elevational view illustrating typical components of the pallet of FIG. 2, with certain parts being broken away in the drawing for clarity.
Figure 4:
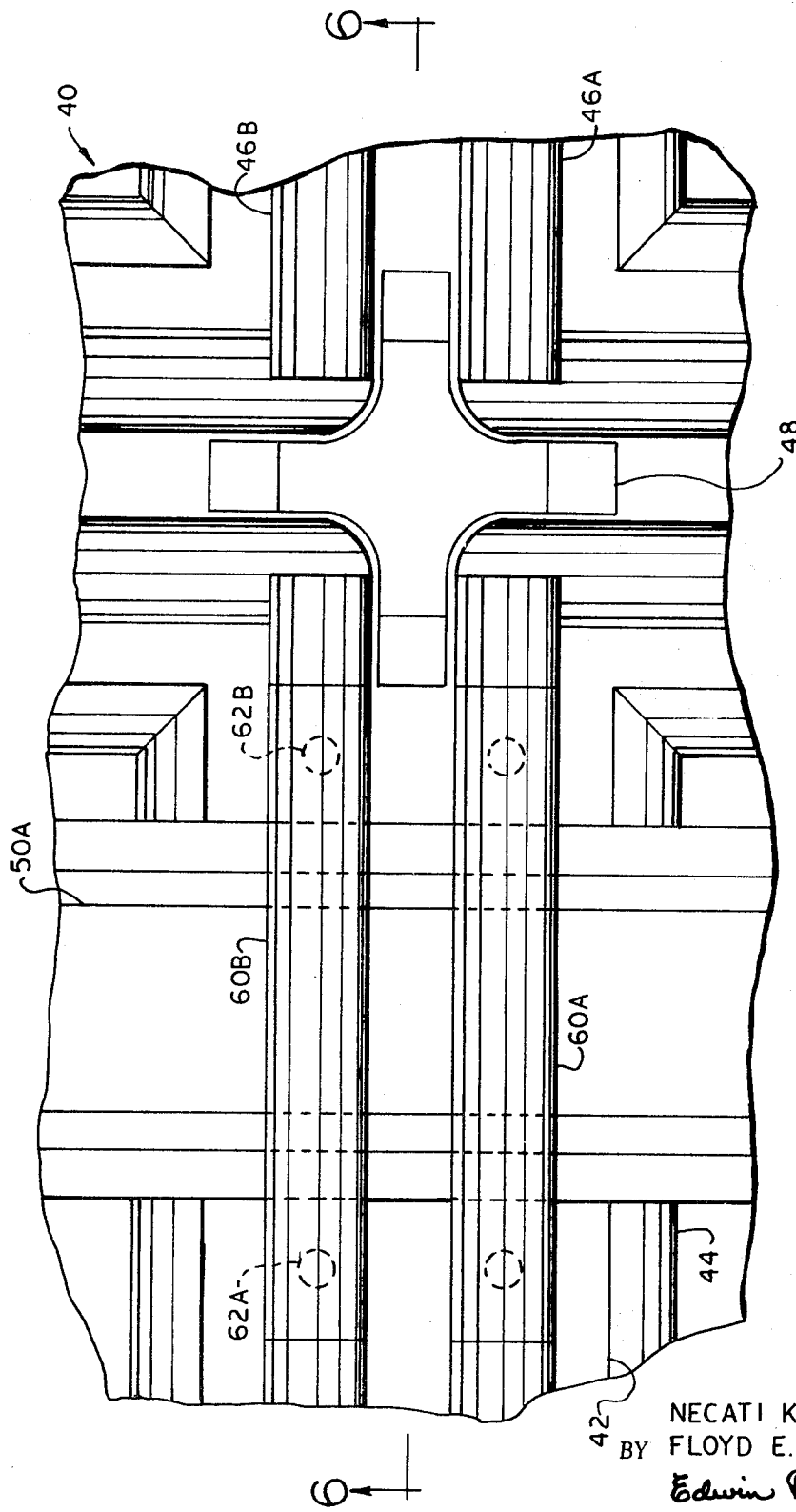

As illustrated in FIG. 1 and more clearly shown in FIGS. 3 and 4, each guide member of the main and secondary tracks 10, 14 consists of a base plate, generally designated by the number 40 and including upper and lower portions 42, 44, and a pair of rails 46A, 46B fixedly attached by means of a plurality of bolts and nuts to said base plate and disposed in spaced, parallel relation. More specifically, most of the rails 46A, 46B are formed of sections which are spaced apart longitudinally to provide gaps in the main and secondary tracks 10, 14 at the points of intersection thereof (see FIGS. 4, 5 and 6). The center-to-center spacing of associated pairs of the rails 46A, 46B (i.e., the distance between the two lines each of which extends longitudinally of a respective one of the pairs of rails 46A, 46B and is equidistant from said rails) is equal to the length of the sides of the aforementioned square at the corners of which the ball supports 20 of each pallet 16 are centered. Hence each of the pallets can be supported on the rails by engaging two of its ball supports with each pair of rails.

Since the ball supports of pallet 16 ride on rails 46A, 46B of the main and secondary tracks 10, 14 and said rails contain gaps, roll plates 48, 48' are fixedly mounted on base plate 40 at the intersections of said main and secondary tracks to support the ball supports when they roll off the rails at said intersections. More particularly, cruciform roll plates 48 are employed at points where secondary tracks 14 cross main tracks 10 (see FIG. 4) and tee roll plates 48' are employed at points where the secondary tracks intersect, but do not cross, the main tracks (see FIG. 5). The arms of the roll plates in each case are respectively parallel to and extend between adjacent pairs of rails 46.

Figure 7:
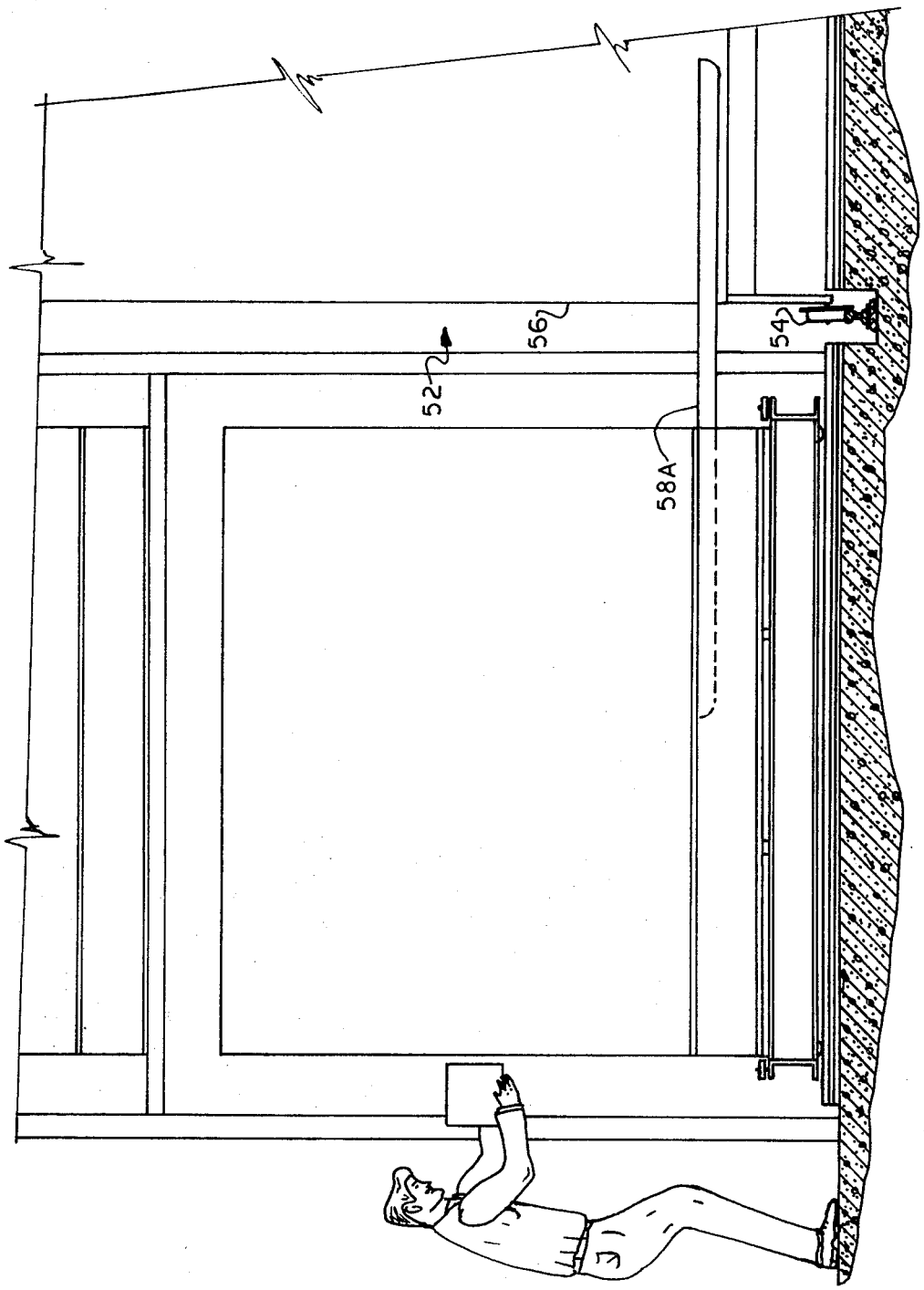
FIG. 7 is an elevation view of components of the same embodiment of the invention, taken along the plane represented by the broken line designated 7—7 in FIG. 1 and in the direction indicated therein.

The preferred embodiment of the invention also includes a pair of carrier tracks 50A, 50B of conventional railroad type (see FIGS. 1, 4 and 6) which are disposed parallel to main tracks 10A, 10B and located on the outer side thereof. Carrier tracks 50 support a carrier, generally designated by the number 52 in FIG. 7, which is provided with flanged wheels 54, a rigid body 56, and a pair of arms 58A, 58B (only one of which can be seen in FIG. 7) which project horizontally therefrom. To permit movement of carrier 52 along carrier tracks 50, each rail 46 is formed with removable sections 60 at the points where the rail crosses over said carrier tracks, and each base plate 40 is cut away at the same points (see FIGS. 4 and 6). Two pins 62A, 62B which are respectively located adjacent the ends of each section 60 slidably fit within holes 64A, 64B formed in adjacent ends of base plates 40 and hold the section in proper alignment with said rail.

The preferred construction of the invention also includes a rotatable table 66 (see FIG. 1) which is mounted on a vertical post 68 and positioned adjacent one end of main tracks 10. Table 66 has a plurality of parallel support rollers 70 mounted on its upper surface, these rollers being even with the rollers 22 of a pallet 16 positioned adjacent said table.

FIGS. 8 and 9 illustrate V-shaped tracks 72, 72' which may be employed in conveying apparatus constructed in accordance with this invention in place of the rails 46 described hereinbefore. Two tracks 72 must of course be disposed in parallel relation to form a main line corresponding to tracks 10A, 10B of FIG. 1, and a plurality of tracks 72' are disposed in parallel pairs which intersect tracks 72 and thus correspond to tracks 14 of the same drawing. Triangular braces 74 are welded to tracks 72, 72' and to base plate 76 to hold said tracks in position.

OPERATION

One of the advantageous features of conveying apparatus constructed in accordance with this invention can readily be recognized by consideration of the arrangement of the pallets 16 which are positioned in abutting, end-to-end relation on the pair of secondary tracks 14 which are uppermost in FIG. 1. It will be understood that when pallets 16 are disposed in the illustrated relation and locked in position on secondary tracks 14 (or on main tracks 10) by suitable means, such as wedges (not shown) placed against ball supports 20 and between rails 46A, 46B, the support rollers 22 mounted at the upper surfaces of pallets 16 make it possible for the apparatus to be used in the same manner as conventional conveying equipment comprising a plurality of rollers mounted between parallel frames. Furthermore, pallets 16 can be moved individually along main tracks 10 and any pair of secondary tracks 14. It should be noted at this point that the arrangement of the pallets and tracks is such that any one of said pallets can be moved along main tracks 10 to a position wherein its ball supports rest on roll plates 48 (in which position the ball supports 20 are respectively aligned between pairs of the rails 46A, 46B of a selected pair of secondary tracks 14) and then the pallet can be shifted in a direction perpendicular to main tracks 10 onto the secondary tracks. Since both main tracks 10 and secondary tracks 14 may be of any desired length and number, the disclosed apparatus provides great versatility in the arrangement of a conveying system to meet specific requirements for different materials handling operations.

When sections 60 of rails 46 of secondary tracks 14 are removed, carrier 52 can be moved along carrier tracks 14, and a container resting on a pallet 16 on said secondary tracks and equipped with means for engaging the arms 58A, 58B on said carrier (See FIG. 6) can be moved to a position where it can be lifted by the carrier and then transported to another location along carrier tracks 14.

Table 66 facilitates the loading or unloading of materials from a pallet 16 positioned on the secondary tracks 14 adjacent thereto. Obviously it may be desirable to provide a plurality of such tables for particular conveying systems.

It will be seen from the preceding description and the accompanying drawings that apparatus constructed in accordance with the principles of this invention provides a conveying system of great versatility yet one which is economical to construct and operate. It will also be understood that various modifications may be made in the embodiment of the invention herein disclosed without departing from the concepts of the invention. For example, although each guide member of main tracks 10 and secondary tracks 14 preferably comprises a pair of rails 46A, 46B as described in the above specification and illustrated in the drawings, a single V-shaped track 72, 72' (see FIGS. 8 and 9) may be substituted for each pair of said rails. If this construction is employed, there will be no gaps in the main and secondary tracks at the points of intersection thereof, and thus roll plates 48 are not required.

Furthermore, the width of main tracks 10 and secondary tracks 14 may differ, in which case the center-to-center spacing of said main tracks must be equal to the length of two sides of the rectangle at the corners of which ball supports 20 of each pallet 16 are centered and the center-to-center spacing of said secondary tracks must be equal to the length of the other two sides of said rectangle. Also other types of rotatable support members, such as swivel or ball casters, may be mounted on the upper side of pallets 16 or table 66 in place of the rollers 22, 70 which have been described and illustrated.

As other modifications of similar nature may be made in the apparatus illustrated in FIGS. 1 – 7, the scope of the invention should be considered as being limited only by the terms of the claims appended hereto.

What is claimed as new and useful and desired to be secured by Letters Patent is:

1. Conveying apparatus comprising at least one rigid pallet having rotatable ball supports mounted on the lower side thereof and respectively centered at the corners of a square, a pair of main tracks disposed in spaced, parallel relation, at least one pair of secondary tracks disposed in spaced, parallel relation and each intersecting each of said main tracks each of said tracks is comprised of two rail sections of semi-circular cross sectional configuration placed in a longitudinal side by side spaced relationship, each guide member of said main and secondary tracks comprising a base plate and a pair of rails fixedly mounted on said base plate in spaced, parallel relation, at least some of said rails being formed of sections which are spaced apart longitudinally to provide gaps in said main and secondary tracks at the points of intersection thereof, and a plurality of roll plates respectively fixedly positioned in said gaps, said roll plates being cruciform at points where said secondary tracks cross said main tracks and T-shaped at points where said secondary tracks intersect, but do not cross, said main tracks, the arms of said roll plates being respectively parallel to and extending between adjacent pairs of said rails, the center-to-center spacing of said main and secondary tracks being substantially equal to the length of the sides of said square at the corners of which said ball supports are centered, whereby said pallet can be supported upon and moved along said main and secondary tracks, each of said ball supports having a two point suspension one point of said suspension on each of the outside arc portions of said rail sections.

2. Conveying apparatus as defined in claim 1 wherein said rectangle is a square and the center-to-center spacing of said main and secondary tracks is substantially equal to the length of the sides of said square.

3. Conveying apparatus as defined in claim 1 including a plurality of rotatable support members mounted on the upper side of said pallet.

4. Conveying apparatus comprising a plurality of rigid pallets each having rotatable ball supports mounted on the lower side thereof and respectively centered at the corners of a square, a plurality of support rollers mounted parallel to the upper surface thereof and disposed in spaced, parallel relation, and a plurality of guide rollers mounted along two opposite edges of the upper surface thereof and disposed perpendicular to the longitudinal axes of said support rollers; a pair of main tracks disposed in spaced, parallel relation; at least one pair of secondary tracks disposed in spaced, parallel relation and each intersecting each of said main tracks; each of said main and secondary tracks comprising a base plate and a pair of rails fixedly mounted on said base plate in spaced, parallel relation, said rails comprising two rails sections having semicircular cross-sectional configuration placed in a longitudinal side by side spaced relationship, and at least some of said rails being formed of sections which are spaced apart longitudinally to provide gaps in said main and secondary tracks at the points of intersection thereof; and a plurality of roll plates respectively fixedly positioned in said gaps, said roll plates being cruciform at points where said secondary tracks cross said main tracks and T-shaped at points where said secondary tracks intersect, but do not cross, said main tracks, the arms of said roll plates being respectively parallel to and extending between adjacent pairs of said rails; the center-to-center spacing of said main and secondary tracks being substantially equal to the length of the sides of said square at the corners of which said ball supports are centered, whereby each of said rotatable ball supports can be supported upon and moved along said main and secondary tracks wherein said rotatable ball supports have at least two points of suspension one point of said suspension on each of the outside arc portions of said rail sections.

5. Conveying apparatus as defined in claim 4 including a plurality of support rollers mounted parallel to the upper surface of said pallet and disposed in spaced, parallel relation.

* * * * *